(12) United States Patent
Guidry, Jr.

(10) Patent No.: US 8,147,228 B2
(45) Date of Patent: Apr. 3, 2012

(54) PROGRESSING CAVITY PUMP/MOTOR

(75) Inventor: Michael J. Guidry, Jr., Hockley, TX (US)

(73) Assignee: Robbins & Myers Energy Systems, L.P., Willis, TX (US)

(*) Notice: Subject to any disclaimer, the term of this patent is extended or adjusted under 35 U.S.C. 154(b) by 467 days.

(21) Appl. No.: 12/489,101

(22) Filed: Jun. 22, 2009

(65) Prior Publication Data

US 2010/0322808 A1    Dec. 23, 2010

(51) Int. Cl.
*F01C 1/10* (2006.01)
*F03C 2/00* (2006.01)
*F03C 4/00* (2006.01)
*F04C 18/00* (2006.01)

(52) U.S. Cl. ....... 418/48; 417/410.4; 464/182; 403/355; 403/378; 403/379.3

(58) Field of Classification Search ............... 418/48; 417/410.3, 410.4; 464/182; 403/318, 319, 403/355, 378, 379.3
See application file for complete search history.

(56) References Cited

U.S. PATENT DOCUMENTS

| 3,677,665 | A  | * | 7/1972  | Corkill .......................... 418/48 |
| 3,912,426 | A  | * | 10/1975 | Tschirky ........................ 418/48 |
| 4,446,638 | A  | * | 5/1984  | Novotny et al. ........... 403/379.4 |
| 4,976,638 | A  | * | 12/1990 | Grinde .......................... 464/145 |
| 5,501,580 | A  | * | 3/1996  | Barrus et al. .................. 418/48 |
| 6,199,440 | B1 | * | 3/2001  | Greubel et al. ............. 74/89.23 |
| 2005/0118040 | A1 | * | 6/2005 | Zitka et al. ................. 417/410.4 |
| 2008/0128534 | A1 | * | 6/2008 | McLeod ...................... 464/161 |

* cited by examiner

Primary Examiner — Theresa Trieu
(74) Attorney, Agent, or Firm — Streets & Steele

(57) ABSTRACT

A progressing cavity pump/motor includes a stator tube (12), a rotor (20) within the stator tube, and a coupling assembly (30) interconnecting the upper and lower rotor sections. The coupling includes a drive adapter (32) and a socket adapter (36) for transmitting torque between the upper and lower rotor sections, and at least one alignment surface (60) in cooperation with a mating surface to rotationally position the drive adapter within the socket adapter at a selected circumferential position. The pump/motor may be reliably assembled in the field while maintaining precise axial and rotational positioning of the rotor sections.

20 Claims, 3 Drawing Sheets

PROGRESSING CAVITY PUMP/MOTOR

FIELD OF THE INVENTION

The present invention relates to a progressing cavity pump/motor of the type used in a downhole well to pump fluid to the surface or to convert hydraulic energy into mechanical energy to rotate a bit. More particularly, this invention relates to a progressing cavity pump/motor which has structurally separable upper and lower rotor sections.

BACKGROUND OF THE INVENTION

Progressing cavity pumps and motors have been used for decades in pumping applications and in hydraulic motor applications. A conventional progressing cavity pump consists of a rigid rotor having a contoured exterior surface along an axial length thereof. The exterior surface of the rotor mates with the interior surface of a stator which has a contoured interior surface, with one additional lead on the interior of the stator. This lead difference forms cavities between the rotor and the stator which are continually progressing from one end of the stator to the other when the rotor is turning. Operation of a pump is achieved by mechanically turning the rotor, while operation of a motor is achieved by forcing fluid into one end of the stator to turn the rotor. An elastomeric or plastic material is conventionally bonded to the rigid stator tube, thereby providing a fluid tight seal between the elastomeric stator material and the outer tubular housing.

In some applications, a progressing cavity pump has an extremely long length, e.g., thirty feet or more, which makes transportation and handling of the rotor difficult. During manufacturing, an elongate rotor in two or more pieces may be assembled end-to-end at the manufacturing plant using appropriate jigs. The end of one rotor section may thus be aligned with the adjacent end of another rotor section, so that rotor sections are rotationally aligned when welded together. Such direct alignment of a motor/pump rotor section is difficult to envision in the field or a well site. More specifically, elongate rotor sections of a pump/motor are preferably connected in the field, and do not require welding at the rig site or the use of specialized jigs or tooling.

The disadvantages of the prior art are overcome by the present invention, and an improved progressing cavity pump/motor with upper and lower rotor sections and a coupling assembly for interconnecting these sections is hereinafter disclosed.

SUMMARY OF THE INVENTION

In one embodiment, a progressing cavity pump is provided for positioning along a tubular string in a well to pump fluids to the surface through the tubular string. In another embodiment, the same assembly may be used to create downhole mechanical energy from fluid transmitted downhole to the motor. The pump/motor includes a stator tube, and a rotor within the stator tube. The exterior of the rotor and the interior of the stator tube have contoured surfaces. A coupling assembly interconnects the upper rotor and the lower rotor sections while maintaining the rotor sections in circumferential alignment for cooperation with the stator. The coupling assembly includes a drive adapter secured to one rotor section, a socket adapter secured to the other rotor section, such that torque is transmitted between the drive adapter and the socket adapter, and thus between the rotor sections. At least one alignment surface and a cooperating mating surface are provided for rotationally aligning the drive adapter and the socket adapter, and a lock member axially interconnects the drive adapter and the socket adapter.

According to another embodiment, a rotor as discussed above is provided for a pump/motor, with the rotor cooperating with a stator having an external profile and receiving the rotor therein.

These and further features and advantages of the present invention will become apparent from the following detailed description, wherein reference is made to the figures in the accompanying drawings.

DETAILED DESCRIPTION OF PREFERRED EMBODIMENTS

Figure 1:
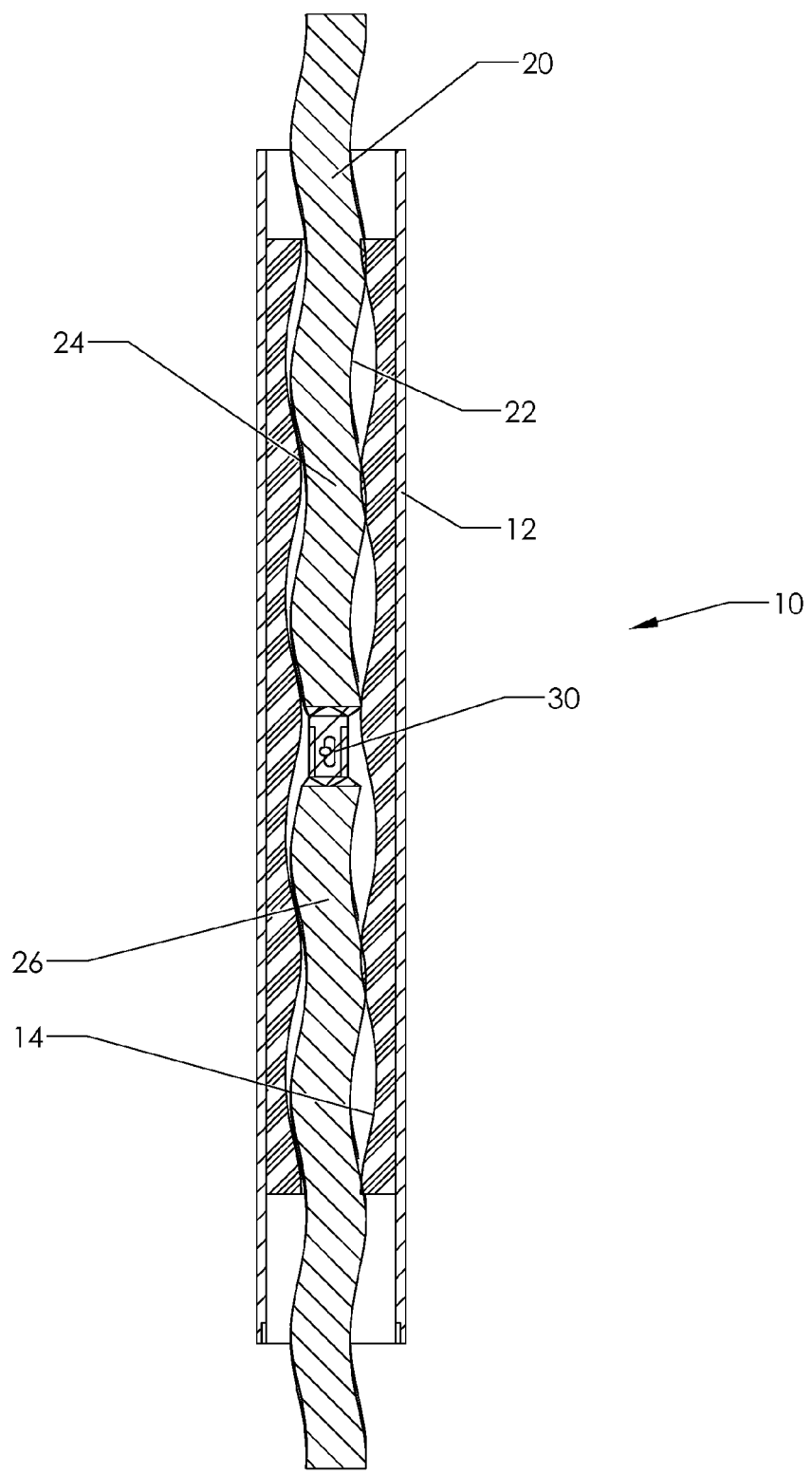
FIG. 1 is a simplified view of a pump/motor according to the present invention.

FIG. 1 is a cross-sectional view of a progressing cavity pump/motor 10, which is positionable along a tubular string in a well to either pump fluids to the surface through the tubular string or to create downhole mechanical energy from fluid transmitted downhole to the pump/motor, e.g., to rotate a bit. The pump/motor 10 includes a stator tube 12 having a contoured interior surface 14 along an axial length thereof. The rotor 20 extends axially within the stator tube and, as shown in FIG. 1, frequently extends vertically above the upper end of the stator tube, and below a lower end of the stator tube. Rotor 20 has an exterior contoured surface 22 creating progressing cavities between the contoured interior surface and the contoured exterior surface when the rotor rotates with respect to the stator tube. More particularly, the rotor 20 includes an upper rotor section 24 and a lower rotor section 26, with these sections being interconnected by a coupling assembly. FIG. 1 illustrates a suitable coupling assembly 30 for interconnecting the upper rotor section 24 and the lower rotor section 26 while maintaining the rotor sections circumferentially aligned for cooperation with the stator to efficiently pump fluid or generate mechanical energy.

Figure 2:
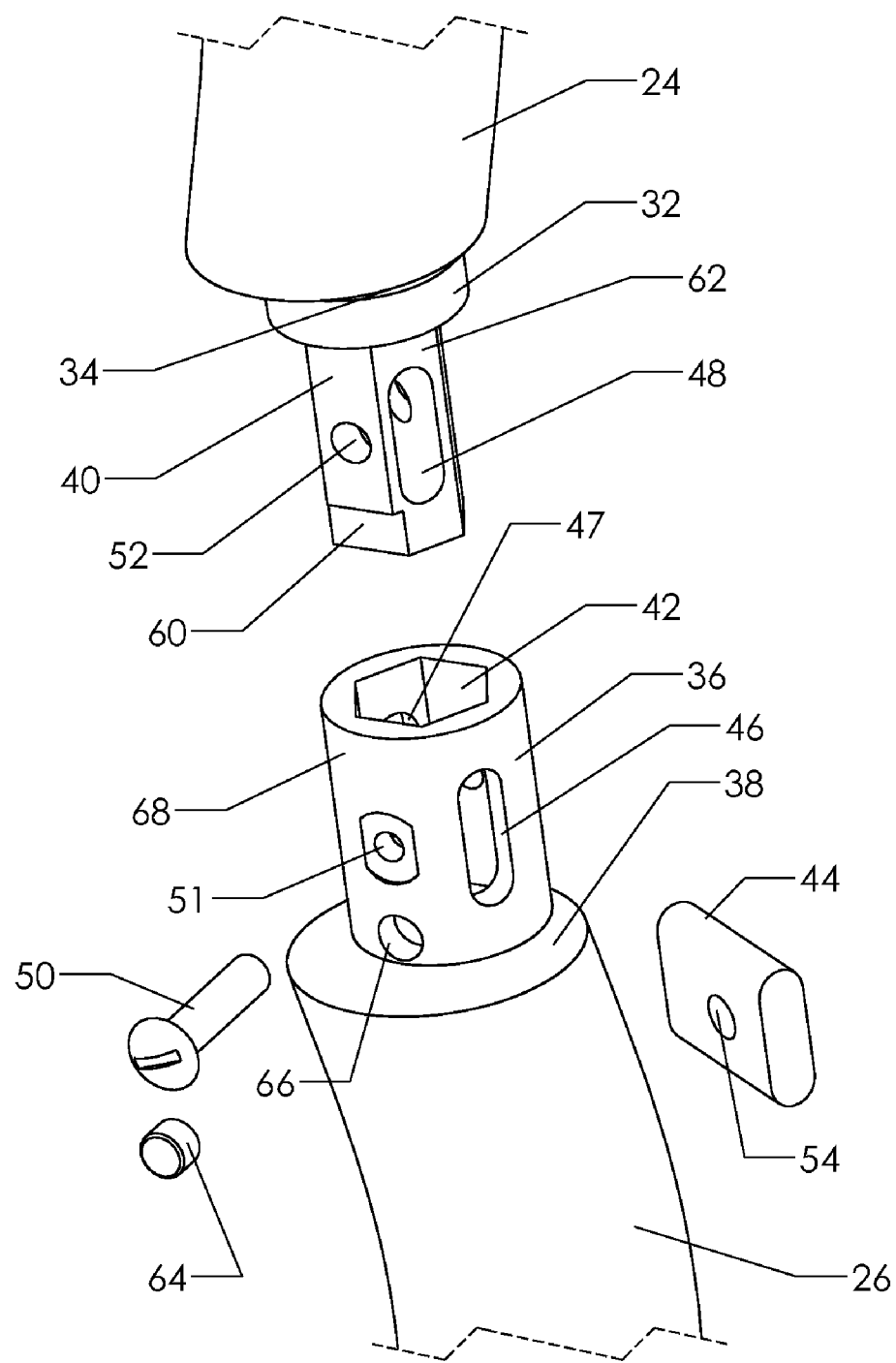
FIG. 2 is an exploded view illustrating a coupling assembly for interconnecting a lower end of one rotor section and an upper end of another rotor section.

FIG. 2 is an exploded view of coupling assembly 30 generally shown in FIG. 1. Coupling assembly 30 includes a drive adapter 32 which is fixed to a lower end of the upper rotor section 24 by weld 34, which may conveniently be made at a rotor manufacturing facility. The coupling 30 also includes a socket adapter 36 which is secured by weld 38 in the upper end of the lower rotor section 26. The drive adapter includes a plurality of circumferentially spaced non-cylindrical surfaces 40, such as hex surfaces, which allow the drive adapter to be inserted into the pocket 42 of the socket adapter 36 such that torque may be reliably transmitted between the drive adapter 32 and the socket adapter 36, and thereby transmitted between the upper rotor section 24 and the lower rotor section 26.

A locking member, such as lock pin 44, is inserted through side pocket 46 in socket adapter 36, and passes through similarly shaped throughport 48 in the drive adapter 32, such that the forward end of the lock pin 44 then fits within another side pocket 47 in the socket adapter 36 circumferentially opposite the side pocket 46. It is a particular feature of the present invention that the lock pin 44 has an axially extending height which is significantly greater than its width, i.e., at least two time its width. The radial length of the lock pin is designed to fit within the circumferentially opposing ports 46, 47 and the pocket 48. Once the lock pin is properly positioned in place, a retaining screw or pin 50 may be passed through a port 51 in the wall of the socket adapter 36 then through a similarly shaped aperture 52 in drive adapter 32, through the similarly shaped hole 54 and the lock pin 44, and finally into circumferentially opposing holes in the drive adapter and in the socket adapter. The screw or pin 50 thus locks the lock pin in place, while the lock pin itself is designed to absorb substantial axial forces transmitted between the rotor sections.

Coupling 30 includes a mechanism for rotationally aligning the drive adapter 32 with respect to the socket adapter 36, since the rotor sections must be axially secured together and rotationally aligned to perform the desired function when the rotor is rotated within the stator tube. In a preferred embodiment, the drive adapter 32 includes an alignment surface 60 at a lower end of the male member 62. Pocket 42 in the socket adapter 36 may have a hexagonal configuration along its length to rotate the hex shape of the male member 62. Alignment pin 64 may be inserted into port 66 of the socket adapter 36 so that its inner end projects into the pocket 42. When properly positioned in place, the alignment pin 64 may be tack welded in place at the manufacturing facility. The radially inward end of the alignment pin 64 forms a projection within the pocket 42 so that male member 62 can only be fully inserted within the pocket 42 of the female member 68 when the alignment face 60 is properly aligned circumferentially for being adjacent the radially inward end of alignment pin 64 so that the male member may be fully inserted into the female member. Due to the coupling 30, the circumferential position of the upper rotor section 24 with respect to the lower rotor section 26 is known. The exact axial position between the drive adapter 32 and the socket adapter 36 is also known. The pump/motor may be assembled in the field, and the interior and exterior surfaces of the rotor and stator must be properly aligned for efficient operation.

Rotational alignment of the rotor sections may be performed with various non-cylindrical surfaces 40 on the drive adapter and a mating surface on the socket adapter, as discussed above. Precise rotational alignment of the drive adapter and the socket adapter, and thus of the rotor sections, may thus be performed with the same surfaces which transmit torque between these adapters, although proper alignment will require some difference in one or more of the torque transmitting surfaces so that the user will know that the rotor sections are rotationally aligned, rather than being "off" by 30° or 60°. The hex configuration on the male member and the pocket on the female member may be reliably used to transmit torque, with a keyway in the exterior of the male member and the interior of the pocket and a suitable key may be used to rotationally align these members. The design as disclosed herein is particularly well-suited for reliable field assembly and disassembly.

The stator as disclosed herein has a single piece exterior housing. While the rotor disclosed herein may be used with such a stator, the rotor also could be used with a stator providing upper and lower stator sections and interconnected by stator sections, as disclosed in pending U.S. application Ser. No. 12/483,453 filed Jun. 12, 2009. Those skilled in the art will understand that a progressing cavity pump/motor as disclosed herein in practice may consist of two, three or more pumps in series and phased together to functionally form one larger pump.

Pin 44 as shown in FIG. 2 is a suitable form of a pin for withstanding a high axial load transmitted through the pin and between the upper and lower sections. If desired, the pin 44 may be tapered to ensure a tight connection. In another embodiment, two shorter pins may be inserted from opposing sides each into a recess 48, with the head of each pin positioned within a slightly larger pocket 46. The ends of the two pins could be configured for a snap connection between the central axis of the coupling. The two pins would thus replace single pin 44, and may obviate the need of retainer pin 50. In yet other embodiments, multiple pins may be circumferentially positioned about the socket adapter, with each pin passing through an aperture in the socket adapter and positioned within a hole in the male member, or the pin may be positioned in a hole extending completely through the male member so that both pin ends engage the socket adapter.

A significant feature of the coupling 30 according to the present invention is that it reliably rotationally aligns the rotor sections and fixes the axial spacing between the sections, while the coupling itself is relatively simple and fits within or at least substantially within the space which would otherwise be occupied by a rotor if the sections were welded together at the factory. In other words, the diameter of the coupling 30 is less than the diameter of rotor, so that regardless of where the coupling is positioned within the stator it does not engage either wall of the stator.

Figure 3:
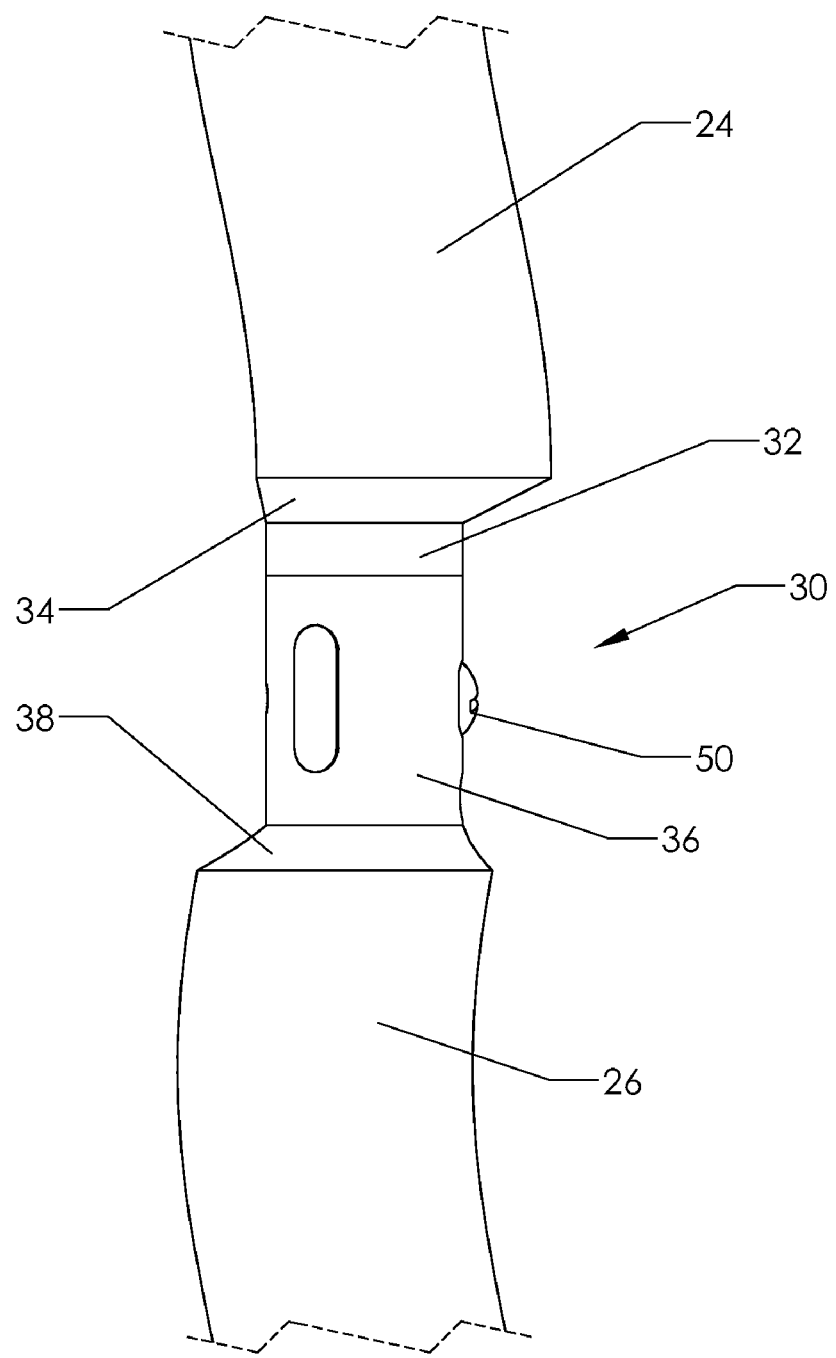
FIG. 3 is a pictorial view of the coupling assembly interconnecting an upper rotor and a lower rotor, and depicting the welds between each end of the coupling and the respective rotor.

FIG. 3 depicts the coupling 30 interconnecting the lower end of upper rotor 24 and the upper end of lower rotor 26. The welds between each end of the coupling and the respective rotor section, namely welds 34, 38, are substantial welds in order to withstand the cyclic loading on the rotor, as discussed above. FIG. 3 also depicts the head of the retaining screw or pin 50.

For the embodiment discussed above, the contoured interior surfaces along the length of the stator tube are formed from an elastomeric material which is securely bonded to an outer tubular housing. In other embodiments, the outer housing itself may have a contoured interior surface, so that a uniform thickness elastomeric layer may be bonded to the outer contoured surface of this revised housing. In still other embodiments, no elastomeric layer is provided, and the interior contoured surface of the metal stator tube creates a progressing cavity when a rotor with an exterior contoured surfaces is rotated therein.

A coupling for axially interconnecting upper and lower rotor sections preferably includes torque transmission surfaces on both the drive adapter and the socket adapter, such as the surfaces 40 and 42 discussed above, and also includes a locking member for axially interconnecting the drive adapter and the socket adapter, such as pin 44. It is a particular feature of the invention that the torque transmission surfaces are separate from the locking member surfaces which axially interconnect the drive adapter and the socket adapter. Considered embodiments include a cylindrical-shaped male member on the drive adapter and a cylindrical cavity within the socket adapter, in which case a suitable lock pin functions both to transmit torque between the upper and lower sections and to resist axial separation of the drive and socket adapters. Depending on the application, a downhole pump/motor as disclosed herein may subject sections of the rotor to high cyclic fatigue, and those same forces may be experienced by the coupling. Accordingly, a comparatively long life is assured by providing torque transmission surfaces which provide a high contact area between the rotating drive adapter and the rotated socket adapter. Also, it should be understood that a symmetrical design for the drive adapter and the socket adapter (e.g., a hex design) includes at least one alignment surface to rotationally position the drive adapter within the socket adapter at a selected circumferential position. In other embodiments, this alignment surface function may be performed by non-symmetrical torque transmitting surfaces.

A coupling as disclosed herein can be turned end-to-end, so that the drive adapter is attached to the lower rotor section and the socket adapter is affixed to the upper rotor section. The coupling as disclosed herein achieves a known and consistent orientation between the upper and lower rotor sections, each with contoured exterior surfaces for cooperation with the interior contoured surface of the stator. Rotational alignment of the stator sections within a tolerance of 20 or less is particularly significant so that the efficiency of the pump/motor is maintained.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A progressing cavity pump/motor for positioning along a tubular string in a well to pump fluids to the surface through the tubular string or to create downhole mechanical energy from fluid transmitted downhole to the pump/motor, comprising:
    a stator tube having a contoured interior surface along an axial length thereof;
    a rotor extending axially within the stator tube, the rotor having a contoured exterior surface creating progressing cavities between the contoured interior surface and the contoured exterior surface when the rotor rotates with respect to the stator tube; and
    a coupling for axially interconnecting a lower end of an upper rotor section having the contoured exterior surface and an upper end of a lower rotor section having contoured exterior surface, the coupling maintaining the upper and lower rotor sections in phased relationship for cooperating with the stator tube, including (a) a drive adapter secured to one of the upper rotor section and the lower rotor section and having a male member with a non-cylindrical exterior surface, (b) a socket adapter secured to the other of the upper rotor section and the lower rotor section and having a non-cylindrical interior surface forming a pocket for receiving the male member therein, such that torque is transmitted between the drive adapter and the socket adapter, (c) at least one alignment surface secured to one of the drive adapter and the socket adapter for cooperation with at least one mating surface secured to the other of the drive adapter and the socket adapter to rotationally position the drive adapter within the socket adapter at a selected circumferential position to rotationally align the upper rotor section and the lower rotor section, and (d) a lock member for axially interconnecting the drive adapter and the socket adapter and maintaining a desired axial spacing between the upper rotor section and lower rotor section.

2. The progressing cavity pump/motor as defined in claim 1, further comprising:
    a retention member for securing the lock member in position with respect to the drive adapter and the socket adapter.

3. The progressing cavity pump/motor as defined in claim 1, wherein the lock member is a pin positioned within an aperture in each of the drive adapter and socket adapter.

4. The progressing cavity pump/motor as defined in claim 3, wherein the socket adapter includes at least one side port extending through the wall of the socket adapter for receiving the lock pin.

5. The progressing cavity pump/motor as defined in claim 4, wherein the socket adapter includes radially opposing apertures each for receiving a respective end of the lock pin when positioned for locking the drive adapter to the socket adapter.

6. The progressing cavity pump/motor as defined in claim 1, wherein the drive adapter is fixed to one of the upper rotor section and the lower rotor section by welding.

7. The progressing cavity pump/motor as defined in claim 1, wherein the socket adapter is fixed to the other of the upper rotor section and the lower rotor section by welding.

8. The progressing cavity pump/motor as defined in claim 1, wherein the contoured interior surface of the stator tube is formed from an elastomeric layer secured within an outer tubular shaped housing.

9. The progressing cavity pump/motor as defined in claim 1, wherein the lock member has an axial height greater than its width along its radial length extending between the drive adapter and the socket adapter.

10. The progressing cavity pump/motor as defined in claim 1, wherein the at least one alignment surface is secured to the drive adapter, and the at least one mating surface is an end surface of an alignment pin secured to the socket adapter and extending into the pocket.

11. A progressing cavity pump/motor for positioning along a tubular string in a well to pump fluids to the surface through the tubular string or to create downhole mechanical energy from fluid transmitted downhole to the pump/motor, comprising:
    a stator tube having a contoured interior surface along an axial length thereof,
    a rotor extending axially within the stator tube, the rotor having a contoured exterior surface creating progressing cavities between the contoured interior surface and the contoured exterior surface when the rotor rotates with respect to the stator tube;
    a coupling for axially interconnecting a lower end of an upper rotor section having the contoured exterior surface and an upper end of a lower rotor section having the contoured exterior surface, the coupling maintaining the upper and lower rotor sections in phased relationship for cooperating with the stator tube, including (a) a drive adapter secured to one of the upper rotor section and the lower rotor section and having a male member with a non-cylindrical exterior surface, (b) a socket adapter secured to the other of the upper rotor section and the lower rotor section and having a non-cylindrical interior surface forming a pocket for receiving the male member therein, such that torque is transmitted between the drive adapter and the socket adapter, the socket adapter having a diameter less than the rotor and positioned wherein the contoured interior surface of the stator tube, (c) at least one alignment surface secured to one of the drive adapter and the socket adapter for cooperation with at least one mating surface secured to the other of the drive adapter and the socket adapter to rotationally position the drive adapter within the socket adapter at a selected circumferential position to rotationally align the upper rotor section and the lower rotor section, and (d) a lock pin for axially interconnecting the drive adapter and the socket adapter and maintaining a desired axial spacing between the upper rotor section and lower rotor section, the lock pin positioned within an aperture in the drive adapter and in a side port in the socket adapter.

12. The progressing cavity pump/motor as defined in claim 11, wherein the socket adapter includes radially opposing apertures each for receiving a respective end of the lock pin when positioned for locking the drive adapter to the socket adapter.

13. The progressing cavity pump/motor as defined in claim 11, wherein the drive adapter is fixed to one of the upper rotor section and the lower rotor section by welding, and the socket adapter is fixed to the other of the upper rotor section and the lower rotor section by welding.

14. The progressing cavity pump/motor as defined in claim 11, wherein the contoured interior surface of the stator tube is formed from an elastomeric layer secured within an outer tubular shaped housing.

15. The progressing cavity pump/motor as defined in claim 11, wherein the at least one alignment surface is secured to the drive adapter, and the at least one mating surface is an end surface of an alignment pin secured to the socket adapter and extending into the pocket.

16. A rotor for a progressing cavity pump/motor, the pump/motor including a stator tube having a contoured interior surface along an axial length thereof and positionable along a tubular string in a well to pump fluids to the surface through the tubular string or to create downhole mechanical energy from fluid transmitted downhole to the pump/motor, the rotor comprising:
   the rotor having an upper rotor section and a lower rotor section; and
   a coupling for axially interconnecting a lower end of the upper rotor section having the contoured exterior surface and an upper end of the lower rotor section having the contoured exterior surface, the coupling maintaining the upper and lower rotor sections in phased relationship for cooperating with the stator tube, including (a) a drive adapter secured to one of the upper rotor section and the lower rotor section and having a male member with a non-cylindrical exterior surface, (b) a socket adapter secured to the other of the upper rotor section and the lower rotor section and having a non-cylindrical interior surface forming a pocket for receiving the male member therein, such that torque is transmitted between the drive adapter and the socket adapter, (c) at least one alignment surface secured to one of the drive adapter and the socket adapter for cooperation with at least one mating surface secured to the other of the drive adapter and the socket adapter to rotationally position the drive adapter within the socket adapter at a selected circumferential position to rotationally align the upper rotor section and the lower rotor section, and (d) a lock member for axially interconnecting the drive adapter and the socket adapter and maintaining a desired axial spacing between the upper rotor section and lower rotor section.

17. The rotor as defined in claim 16, wherein the lock member is a lock pin positioned within an aperture in the male adapter, and the socket adapter includes at least one side port extending through the wall of the socket adapter for receiving the lock pin.

18. The rotor as defined in claim 17, wherein the socket adapter includes radially opposing apertures each for receiving a respective end of the lock pin when positioned for locking the drive adapter to the socket adapter.

19. The rotor as defined in claim 16, wherein the drive adapter is fixed to one of the upper rotor section and the lower rotor section by welding and the socket adapter is fixed to the other of the upper rotor section and the lower rotor section by welding.

20. The rotor as defined in claim 16, wherein the at least one alignment surface is secured to the drive adapter, and the at least one mating surface is an end surface of an alignment pin secured to the socket adapter and extending into the pocket.

* * * * *